(12) United States Patent
Friedrichs

(10) Patent No.: US 6,905,243 B2
(45) Date of Patent: Jun. 14, 2005

(54) BUOYANCY LIQUID FOR GALILEAN THERMOMETER

(75) Inventor: Arvid Friedrichs, Kreuzwertheim (DE)

(73) Assignee: Dr. Friedrichs Gruppe GmbH, Wertheim (DE)

( * ) Notice: Subject to any disclaimer, the term of this patent is extended or adjusted under 35 U.S.C. 154(b) by 0 days.

(21) Appl. No.: 10/201,349

(22) Filed: Jul. 22, 2002

(65) Prior Publication Data

US 2003/0099278 A1 May 29, 2003

(30) Foreign Application Priority Data

Nov. 17, 2001 (DE) .......................................... 101 56 613
Nov. 17, 2001 (DE) .......................................... 201 18 790

(51) Int. Cl.$^7$ .............................. G01K 1/06; G01K 1/22
(52) U.S. Cl. ........................ 374/156; 374/100; 374/208
(58) Field of Search ................................. 374/156, 159, 374/100, 208; 252/71

(56) References Cited

U.S. PATENT DOCUMENTS

| | | | | |
|---|---|---|---|---|
| 3,809,152 A | * | 5/1974 | Boehmer ...................... | 165/51 |
| 4,008,294 A | * | 2/1977 | Marans et al. ............... | 525/168 |
| 4,190,727 A | * | 2/1980 | Oude Alink .................. | 549/36 |
| 4,502,977 A | * | 3/1985 | Buriks et al. ................ | 252/340 |
| 4,620,941 A | * | 11/1986 | Yoshikawa et al. .......... | 252/408 |
| 4,950,702 A | * | 8/1990 | Arendt ........................ | 524/292 |
| 104,564 A | * | 4/1992 | Lermond et al. ............ | 252/170 |
| 5,104,564 A | * | 4/1992 | Lermond et al. ............ | 510/412 |
| 5,346,986 A | * | 9/1994 | Schneider et al. ........... | 528/495 |
| 5,643,672 A | * | 7/1997 | Marchi et al. ............... | 428/402 |
| 6,030,530 A | | 2/2000 | Esposito et al. | |
| 6,140,400 A | * | 10/2000 | Figge et al. ................. | 524/272 |
| 6,462,002 B2 | * | 10/2002 | Saxena et al. ............... | 510/141 |
| 6,638,497 B2 | * | 10/2003 | Barinova et al. ........... | 424/70.1 |
| 2002/0020832 A1 | * | 2/2002 | Oka et al. .................... | 252/500 |

FOREIGN PATENT DOCUMENTS

| | | | |
|---|---|---|---|
| DE | 90 06 498.4 | 6/1990 | |
| DE | 19635860 A1 * | 3/1998 | ........... G01K/11/28 |
| DE | 201 18 790 | 11/2001 | |
| FR | 2 737 219 | 7/1995 | |

OTHER PUBLICATIONS

Derwent Information Ltd. May 2001. Galilean thermometer has stack of hollow part filled floats is easy to read.*

Abstract of the document No. 129:330453 a new technological development on the synthesis of propylene glycol ethers. Jin et al. 1967.*

* cited by examiner

Primary Examiner—Gail Verbitsky

(57) ABSTRACT

The invention relates to a buoyancy liquid for a Galilean thermometer, comprising at least a dipropylene glycol mono ($C_{1-6}$-alkyl) ether, preferably at least a dipropylene glycol mono($C_{1-6}$-alkyl) ether of the following general formula (wherein R is a $C_{1-6}$-alkyl group):

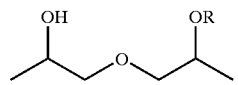

as well as to a Galilean thermometer comprising said buoyancy liquid, and to a method of preparing a Galilean thermometer including the use of this buoyancy liquid.

21 Claims, No Drawings

BUOYANCY LIQUID FOR GALILEAN THERMOMETER

This application claims priority of German Patent Application Nos. 101 56 613.1 and 201 18 790.6, both filed on Nov. 17, 2001.

BACKGROUND OF THE INVENTION

The present invention relates to a buoyancy liquid for a Galilean thermometer, a Galilean thermometer comprising this liquid and a method for preparing the same.

Galilean thermometers function in accordance with the principle of buoyancy and are named after the discoverer of this physical mechanism. As essential components, a Galilean thermometer comprises a plurality of floating bodies in a buoyancy liquid surrounding them. As a rule, the floating beads are hollow balls of glass or another inert material as compared with the buoyancy means. Further, they may be dyed or filled with a coloured substance. Further, they advantageously have a number indication which corresponds to a temperature indication.

The buoyancy liquid has a greater thermal expansion than the floating bodies. When the temperature increases, the floating body continuously looses its buoyancy due to a proportional decrease in density of the buoyancy liquid, until the density of the floating body is greater than that of the surrounding liquid at a certain temperature and the floating body sinks. The temperature at which each individual floating body sinks can be adjusted by correspondingly adjusting the weight of the floating bodies in relation to their displacement volume (i.e. their density).

In order to adjust the floating bodies as exactly as possible, it is advantageous if the difference between the thermal expansion coefficient of the buoyancy liquid and the floating body is as great as possible. A buoyancy liquid, which is suitable under this aspect, is ethanol which has a high thermal expansion coefficient.

However, practically, further requirements have to be met by the buoyancy liquid. Galilean thermometers represent temperature measuring equipment which, apart from measuring the temperature, above all things also serve aesthetic purposes and are predominantly used in the private sphere or as an individual note in office rooms. Therefore, the buoyancy liquid must not represent a danger for the environment in the case of unintentionally coming out. The same also applies for the production process of the thermometers, if the buoyancy liquid is openly handled. Consequently, further requirements regarding the buoyancy liquid will have to be met which include: environmental compatibility and non-poisonousness at skin contact, in case of inhalation of the vapours or of unintentional drinking (e.g. by infants). Further, as to avoid fire, the combustibility should be as low as possible.

To meet one or the other of the above-mentioned requirements, carbon tetrachloride or isoparaffin was used in the past instead of ethanol. However, due to its effect regarding the depletion of the ozone layer, carbon tetrachloride has been prohibited. The isoparaffins have an undesired toxicity when they come into contact with the skin and when they are swallowed and, additionally, they have unfavourable effects on the environment and are thus not preferred.

As a further alternative, ethanol had been used in the past which was mixed with water to decrease the low flash point of pure ethanol. Thereby, the flash point could be raised to a level which is relatively harmless. However, mixtures of ethanol/water have the disadvantage that the difference of the thermal expansion coefficients is low, and, thus, it is difficult to adjust the floating bodies.

BRIEF SUMMARY OF THE INVENTION

Based on the above-described disadvantages of the prior art, it is the object of the present invention to provide a buoyancy liquid for a Galilean thermometer which overcomes the above-described difficulties as far as possible, a Galilean thermometer which comprises this buoyancy liquid, as well as a method for the preparation thereof.

This object is solved by presenting a buoyancy liquid for a Galilean thermometer comprising at least one dipropylene glycol (DPG) mono($C_{1-6}$-alkyl) ether. This object is further solved by a Galilean thermometer comprising this buoyancy liquid. The object according to the invention is further solved by a method for the preparation of a Galilean thermometer which comprises the use of the buoyancy liquid.

DETAILED DESCRIPTION OF THE INVENTION

The present invention provides the following advantageous effects:

Dipropylene glycol mono($C_{1-6}$-alkyl) ethers have a high thermal expansion coefficient, which substantially facilitates the adjustment of the floating bodies.

The ethers according to the invention are environmentally compatible, non-toxic or non-skin-irritant (the structurally very similar free dipropylene glycols are used as components of cosmetic compositions; the compatibility of the ethers according to the invention is very similar to that of free dipropylene glycol).

Due to the mixability of the ether compounds according to the invention with water, the flash point may be decreased or completely eliminated.

In their broadest configuration, the solution proposed by the invention is a buoyancy liquid for a Galilean thermometer which comprises at least one dipropylene glycol mono ($C_{1-6}$-alkyl) ether. The present invention also provides a Galilean thermometer comprising a buoyancy liquid which comprises at least one dipropylene glycol mono ($C_{1-6}$-alkyl) ether. Likewise, the present invention provides a method of preparing a Galilean thermometer, comprising utilizing at least one dipropylene glycol mono ($C_{1-6}$-alkyl) ether.

In one embodiment the buoyancy liquid has the following structure wherein R is a $C_{1-6}$-alkyl group:

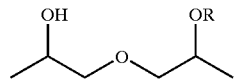

The dipropylene glycol mono($C_{1-6}$-alkyl) ether comprised by the present invention may be a single compound or a mixture of a plurality of compounds.

The $C_{1-6}$-alkyl group comprises the substituents methyl, ethyl, propyl, butyl, pentyl and hexyl, with all constitutional isomer groups being contained, such as e.g.: N-propyl, isopropyl, n-butyl, i-butyl, t-butyl and correspondingly branched embodiments of the $C_5$ and $C_6$ alkyl groups.

The invention further comprises the possible constitutional isomers of the dipropylene glycol structure. Dipropylene glycol is formed by condensation of two molecules of propylene glycol being present in two constitutional isomers, namely 1,2-propylene glycol and 1,3-propylene glycol. According to the invention, the ether may comprise the derivatives of dipropylene glycol of two identical propylene glycol units, as well as also mixture derivatives obtained from, for example, 1,2-propylene glycol and 1,3-propylene glycol. The latter may in turn be divided in two structural subgroups depending on which of the two hydroxyl groups, remaining in the propylene glycol dimmer, is etherified by the $C_{1-6}$-alkyl group.

Preferred, according to the invention, are mono alkyl ethers of di(1,2-propylene glycol). Also preferred are compounds in which the $C_{1-6}$-alkyl group represents a methyl or a butyl group. Especially preferred are the di(1,2-propylene glycol) mono methyl ethers and butyl ethers. These may be used as an individual chemical compound or as an isomer mixture of the above-described kind.

An especially preferred example for practical application is di(1,2-propylene glycol) monomethyl ether which is available on the market as a mixture of constitutional isomers, for example under the trade name Dowanol DPM® of Dow Chemical (available in Germany from the company Brenntag GmbH, 34250 Lohfelden).

According to a further preferred embodiment of the invention, the ether is used in the form of a mixture with water. The addition of water increases the flash point of the buoyancy liquid, thereby decreasing the hazard of fire when it is handled or when it is unintentionally released from the thermometer. The amount of water is preferably of from about 3 to about 50 parts by weight (in the following pbw), relative to 100 pbw of the ether component. Within this range, a satisfying increase of the flash temperature is obtained, on the one hand, and the thermal extension coefficient is maintained on a sufficiently high level for a simple adjustment of the floating bodies, on the other hand.

The water amount is preferably of from about 5 to about 20 pbw, more preferably of from about 7 to about 15 pbw, relative to 100 pbw of the ether component.

The optimum ratio between ether and water, with respect to the increase of the flash temperature, depends in each case on the ether selected. The optimum water amount for dipropylene glycol mono methyl ether is in the range of 9 weight-parts, approximately from 8 to 10 wt.-%. With these and higher amounts of water, the flash point completely disappears, i.e. when the flash point of pure ether at 73° C. is reached, as much water vapour appears together with the ether vapour that an ignition of the gaseous mixture in the common test procedure according to Pensky-Martens is no longer obtained. The test procedure according to Pensky-Martens is described in detail in the Regulation EN 22719, European Committee of Standardization (and ISO 2719, which are incorporated by reference herein). Thus, water proportions of approximately from 8 to 10 pbw are especially preferred.

The above-defined dipropylene glycol ethers have the tendency to become slowly decomposed by irradiation with light in the visible and/or ultraviolet range. For this reason, the buoyancy liquid of the Galilean thermometer according to the invention advantageously comprises a stabilizer. The character of the stabilizer is not specially limited as long as it is dissolvable in the buoyancy liquid and effectively prevents its decomposition.

A particularly preferred stabilizer component is BHT (2,6-di-(t-butyl)-p-cresol).

The amount of the stabilizer is not particularly limited either. Practically, the stabilizer amount is advantageously from about 30 to about 80 parts per million (ppm) (by weight, relative to the weight of the ether component), more preferably from about 40 to about 70 ppm, and most preferably from about 50 to about 60 ppm.

For example, in one particular example, the buoyancy liquid of the present invention comprises 100 parts by weight of a mixture of at least one isomer of dipropylene glycol monomethyl ether, from about 8 to about 12 parts by weight of water, and BHT as a stabilizer.

In the following, examples of buoyancy liquids according to the present invention are indicated, which are most preferred:

EXAMPLE 1

| Dipropylene glycol monomethyl ether | 91 pbw |
| Water | 9 pbw |
| BHT | 0.0055 pbw |
| | (55 ppm) |

EXAMPLE 2

| Dipropylene glycol monobutyl ether | 91 pbw |
| Water | 9 pbw |
| BHT | 0.0055 pbw |
| | (55 ppm) |

The buoyancy liquid of the Galilean thermometer according to the invention may further contain other additives in usual amounts, such as e.g. dyes, wetting agents, or density modifying agents.

What is claimed is:

1. A Galilean thermometer, comprising a buoyancy liquid wherein the buoyancy liquid comprises at least one dipropylene glycol mono($C_{1-6}$-alkyl) ether.

2. The Galilean thermometer according to claim 1, wherein the buoyancy liquid comprises the structure:

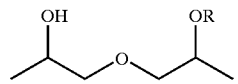

wherein R is a $C_{1-6}$-alkyl group.

3. The Galilean thermometer according to claim 2, wherein said $C_{1-6}$-alkyl group is selected from the group consisting of a methyl group and a butyl group.

4. The Galilean thermometer according to claim 3, wherein the buoyancy liquid comprises a mixture of at least one isomer of dipropylene glycol monomethyl ether.

5. The Galilean thermometer according to claim 3, wherein the buoyancy liquid comprises a mixture of at least one isomer of dipropylene glycol monobutyl ether.

6. The Galilean thermometer according to claim 3, wherein the buoyancy liquid comprises 100 parts by weight of a mixture of at least one isomer of dipropylene glycol monomerhyl ether, and from about 8 to about 12 parts by weight of water and 2,6-di-(t-butyl)-p-cresol.

7. The Galilean thermometer according to claim 1, wherein the buoyancy liquid further comprises water.

8. The Galilean thermometer according to claim 7, wherein said water is present in an amount of from about 3 to about 50 parts by weight, relative to 100 parts by weight of said dipropylene glycol mono($C_{1-6}$-alkyl) ether.

9. The Galilean thermometer according to claim 8, wherein said water is present in an amount of from about 5 to about 20 parts by weight.

10. The Galilean thermometer according to claim 9, wherein said water is present in an amount of from about 7 to about 15 parts by weight.

11. A method for preparing a Galilean thermometer, comprising filling a Galilean thermometer with a buoyancy liquid wherein the buoyancy liquid comprises at least one dipropylene glycol mono($C_{1-6}$-alkyl) ether.

12. The method according to claim 11, wherein the buoyancy liquid comprises the structure:

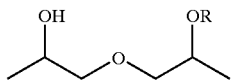

wherein R is a $C_{1-6}$-alkyl group.

13. The method according to claim 12, wherein said $C_{1-6}$-alkyl group is selected from the group consisting of a methyl group and a butyl group.

14. The method according to claim 13, wherein the buoyancy liquid comprises a mixture of at least one isomer of dipropylene glycol monomethyl ether.

15. The method according to claim 13, wherein the buoyancy liquid comprises a mixture of at least one isomer of dipropylene glycol monobutyl ether.

16. The method according to claim 11, wherein the buoyancy liquid further comprises a stabilizer.

17. The method according to claim 16, wherein said stabilizer is 2,6-di-(t-butyl)-p-cresol.

18. The method according to claim 17, wherein said stabilizer is present in an amount of from about 30 to about 80 ppm by weight, relative to the weight of said ether component.

19. The method according to claim 11, wherein the buoyancy liquid comprises 100 parts by weight of a mixture of at least one isomer of dipropylene glycol monomethyl ether, and from about 8 to about 12 parts by weight of water, and 2,6-di-(t-butyl)-p-cresol as a stabilizer.

20. The method according to claim 11, wherein the buoyancy liquid further comprises one or more dyes and/or density modifying agents.

21. A Galilean thermometer, comprising at least one floating body in a buoyancy liquid, wherein said buoyancy liquid comprises at least one dipropylene glycol mono ($C_{1-6}$-alkyl) ether.

* * * * *